United States Patent [19]
Baer

[11] 3,831,724
[45] Aug. 27, 1974

[54] CLUTCH AND COUPLING UNIT
[75] Inventor: John S. Baer, Bar Harbor, Maine
[73] Assignee: Warner Electric Brake & Clutch Company, South Beloit, Ill.
[22] Filed: Nov. 6, 1972
[21] Appl. No.: 304,089

[52] U.S. Cl..................... 192/56 C, 64/14
[51] Int. Cl............................. F16d 43/20
[58] Field of Search....... 192/56 R, 56 C, 26; 64/14, 64/28, 27

[56] References Cited
UNITED STATES PATENTS

| | | | |
|---|---|---|---|
| 2,541,947 | 2/1951 | Starkey | 192/56 C |
| 3,228,209 | 1/1966 | Hersey | 192/56 R |
| 3,335,835 | 8/1967 | Conlon | 192/56 C |
| 3,600,877 | 8/1971 | McCrary | 192/56 R |

OTHER PUBLICATIONS
R. J. Young–Clutch with Torque Overload Control–April 1963–IBM Technical Disclosure Bulletin–Vol. 5 No. 11–Pages 15 and 16.

Primary Examiner—Samuel Scott
Assistant Examiner—Wesley S. Ratliff, Jr.
Attorney, Agent, or Firm—Wolfe, Hubbard, Leydig, Voit & Osann, Ltd.

[57] ABSTRACT

Power is transmitted between driving and driven shafts by way of a normally engaged helical spring clutch and a torsionally yieldable coupling. When a torque overload is exerted on the driven shaft, the resulting torsional deflection of the coupling is used to release the clutch.

8 Claims, 10 Drawing Figures

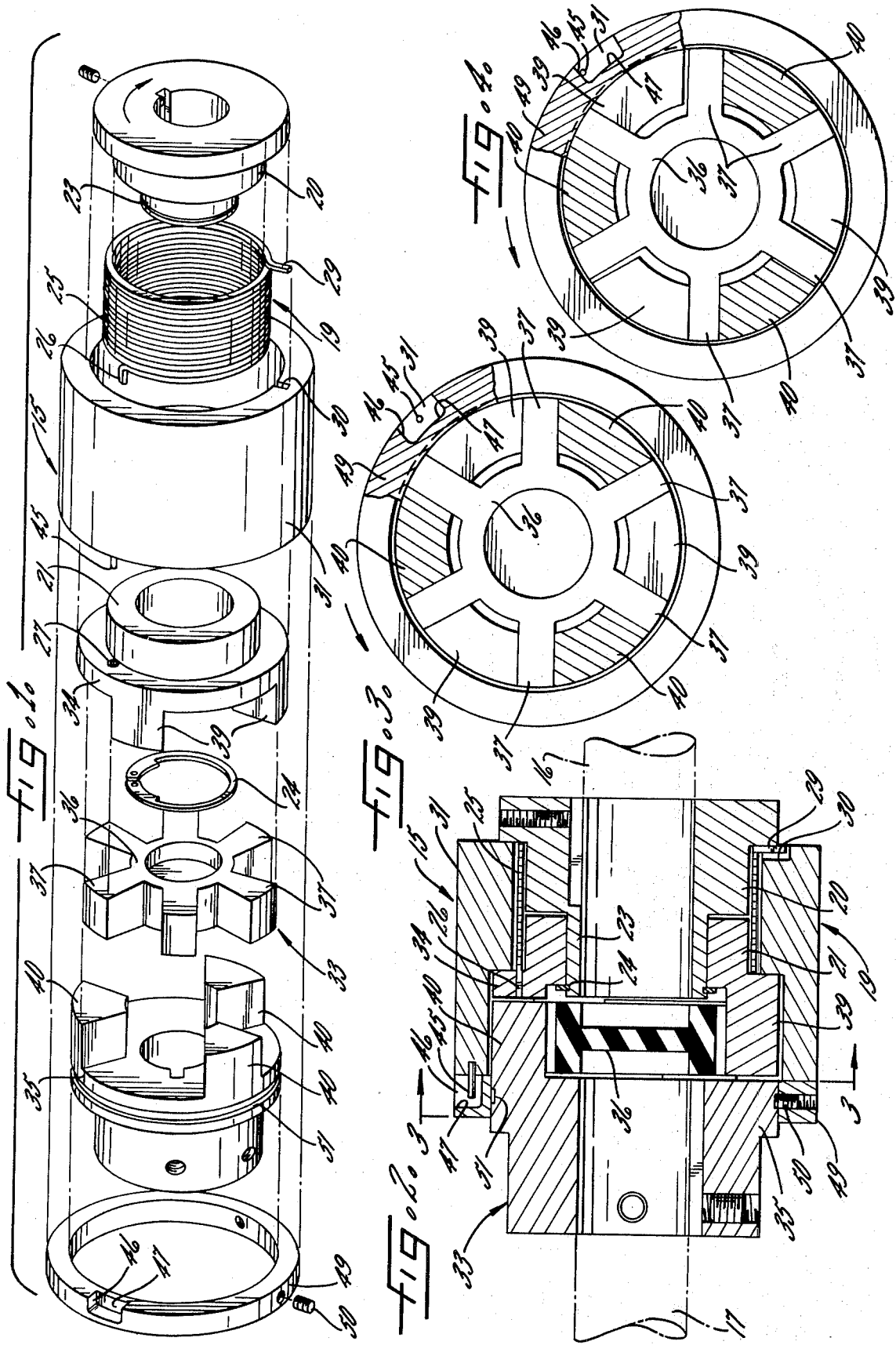

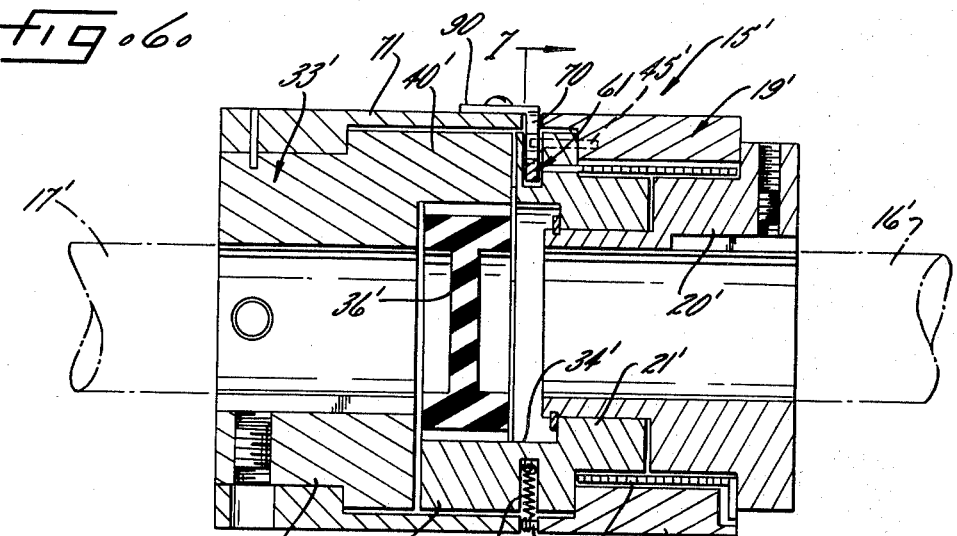
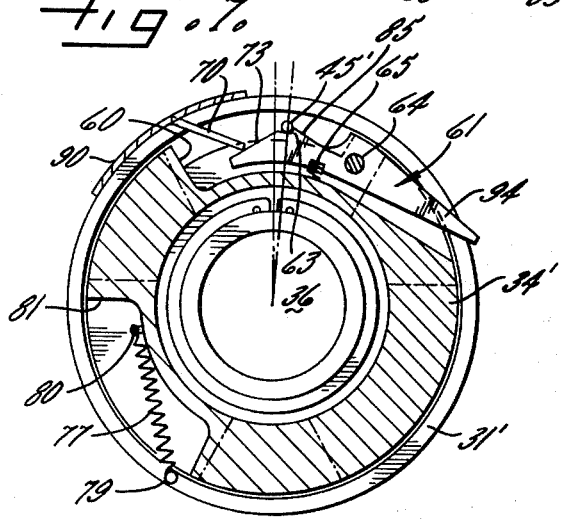
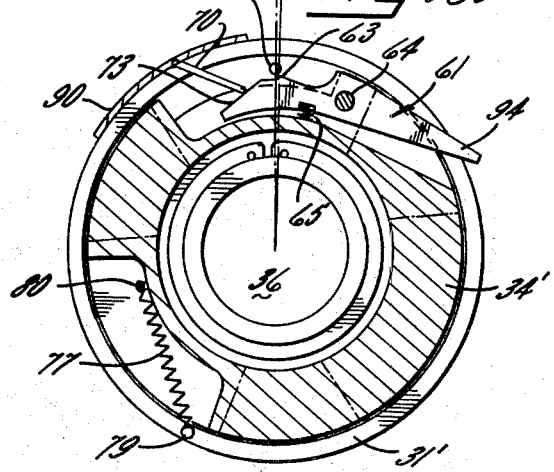
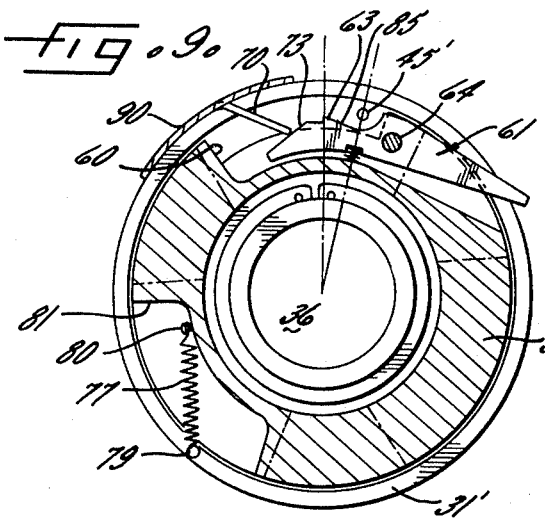
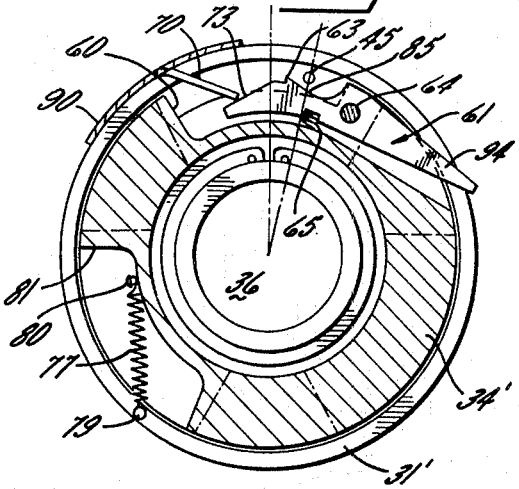

3,831,724

CLUTCH AND COUPLING UNIT

BACKGROUND OF THE INVENTION

This invention is concerned with interrupting the drive between driving and driven shafts when a torque overload is exerted on the driven shaft.

The invention is more specifically concerned with interrupting the drive between shafts which are connected by a normally engaged clutch and a torsionally yieldable coupling. Such couplings are well known and usually comprise a pair of coupling halves adapted to be fastened to the shafts and connected to rotate in a fixed angular relation with respect to one another as long as a given torque load is exerted on the shafts. Upon the application of a higher torque load, the coupling yields to permit one of the coupling halves to turn angularly relative to the other half so as to cushion torsional shocks and damp torsional vibrations which otherwise would be transmitted between the shafts as a result of abrupt changes in load. A coupling of this general type is disclosed in U.S. Pat. No. 3,396,556.

While various types of clutches may be used in carrying out the invention, the preferred clutch is a helical spring clutch whose input and output members are normally coupled for rotation in unison by a coiled helical spring. When a control collar is moved to a given angular position relative to the clutch output member, the spring is released to allow the input member to rotate relative to the output member. A clutch of this general type is disclosed in Baer et al. U.S. Pat. No. 3,726,372.

SUMMARY OF THE INVENTION

The general aim of the present invention is to provide a new and improved clutch and coupling unit in which the relative shaft motion permitted by the yieldable coupling is used to automatically release the clutch when a torque overload is exerted on the shafts.

A more detailed object is the use of one of the coupling halves for causing the clutch control collar to move angularly to its release position when such coupling half deflects a predetermined distance relative to the other coupling half as an incident to a torque overload.

A further object is to provide a clutch and coupling unit of the aforementioned character which may be easily and simply adjusted to cause the clutch to release at overload torques of different magnitudes.

Still other objects are to provide a clutch and coupling unit in which the clutch must be reset manually after being released by a torque overload and to provide a modified unit which is reset automatically when the overload disappears.

These and other objects and advantages of the invention will become more apparent from the following detailed description when taken in conjunction with the accompanying drawings.

BRIEF DESCRIPTION OF THE DRAWINGS

FIG. 1 is an exploded perspective view of one embodiment of a new and improved clutch and coupling unit incorporating the novel features of the present invention.

FIG. 2 is a cross-sectional view taken longitudinally through the unit shown in FIG. 1.

FIG. 3 is a cross-section taken substantially along the line 3—3 of FIG. 2.

FIG. 4 is a view similar to FIG. 3 but showing parts in moved positions.

FIG. 6 is a cross-sectional view taken longitudinally through the unit shown in FIG. 5.

FIG. 7 is a cross-section taken substantially along the line 7—7 of FIG. 6.

FIGS. 8, 9 and 10 are views similar to FIG. 7 but showing parts in successively moved positions.

DETAILED DESCRIPTION OF THE PREFERRED EMBODIMENTS

Figure 5:
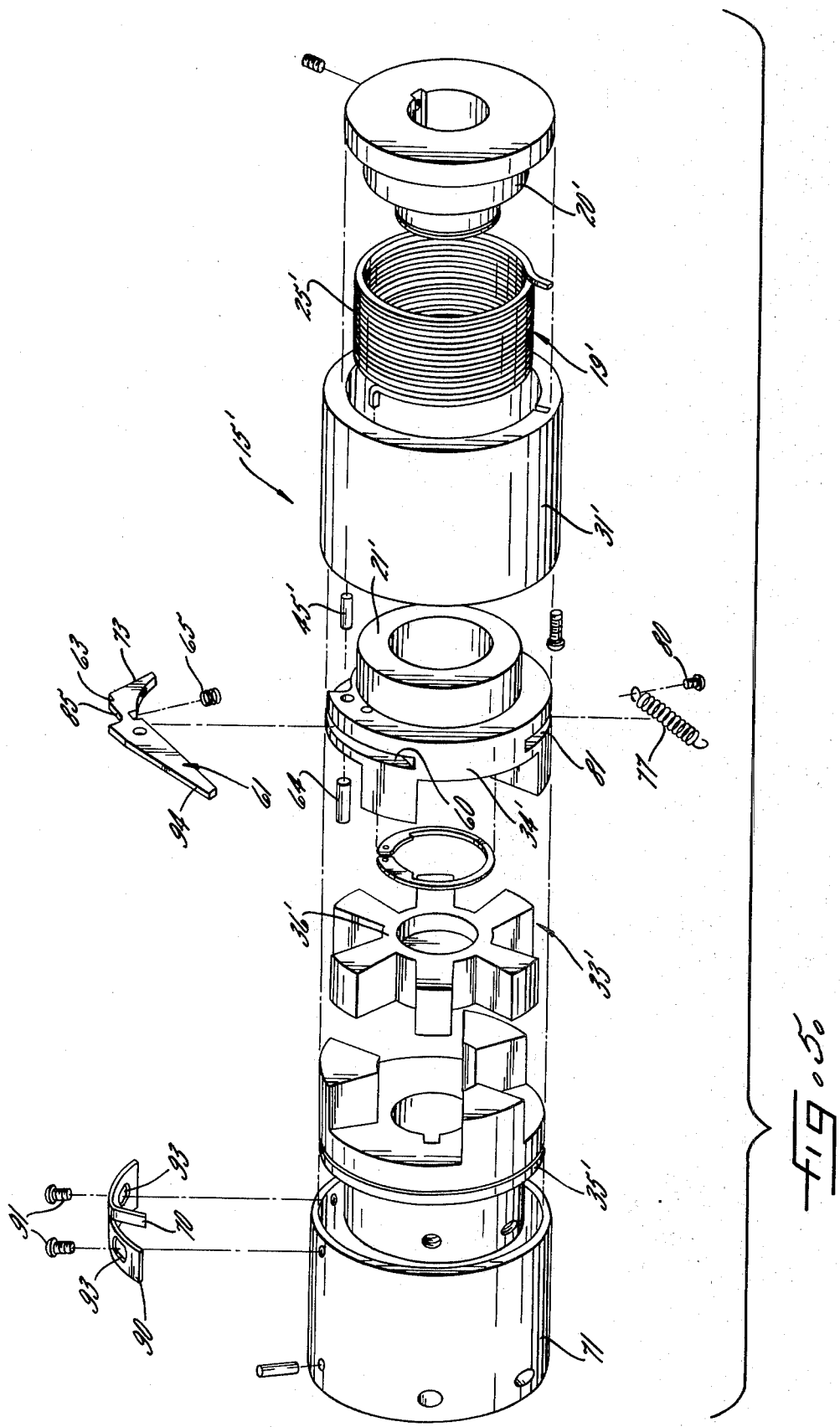
FIG. 5 is an exploded perspective view of another embodiment of a clutch and coupling unit incorporating the features of the invention.

As shown in the drawings for purposes of illustration, the invention is embodied in a clutch and coupling unit 15 for connecting a power-rotated driving shaft 16 with a driven shaft 17. The unit 15 herein comprises a normally engaged helical spring clutch 19 having an input member or hub 20 keyed to the driving shaft and having an output member or hub 21 adapted to rotate the driven shaft, the output hub being telescoped rotatably over an extension 23 (FIG. 2) of the input hub and being held thereon by a snap ring 24.

A coiled helical spring 25 is telescoped over the input and output hubs 20 and 21 and is normally contracted around the hubs to couple the latter for rotation in unison. One end tang 26 of the spring is anchored in a hole 27 in the output hub 21 while the opposite end tang 29 is fitted in a slot 30 formed in one end of a control collar 31 which is telescoped loosely over the spring. When the input hub 20 is rotated in a clockwise direction as viewed from the right in FIG. 1, the spring normally contracts around and couples the hub and causes the control collar to rotate in unison with the hubs and in a fixed angular position relative to the hubs. If the control collar, however, is moved just slightly in a counterclockwise direction relative to the output hub 21, the collar causes the spring to expand and release the output hub so that the input hub can slip or rotate relative to the output hub.

In addition to the clutch 19, the clutch and coupling unit 15 also includes a torsionally yieldable coupling 33 which causes the shafts 16 and 17 to rotate in a substantially fixed angular relation as long as a given torque load is exerted on the driven shaft. If a substantially higher torque load is exerted, the coupling deflects torsionally and allows the driving shaft to turn through a limited angular distance relative to the driven shaft so as to absorb the increased load without subjecting the shafts to severe shock.

While various types of torsionally yieldable couplings may be used, the coupling 33 herein comprises input and output halves 34 and 35 adapted to be coupled yieldably by a spider 36 made of compressible elastomeric material and formed with a series of six radially projecting and angularly spaced lugs 37. In this particular instance, the input half 34 of the coupling is an integral part of the output hub 21 of the clutch 19 and is formed with three axially projecting and angularly spaced jaws 39 located to fit within alternate ones of the spaces between the lugs 37. The output half 35 of the coupling is keyed to the driven shaft 17 and is formed with three similar jaws 40 which fit within the remaining spaces between the lugs 37.

With the foregoing arrangement, the input half 34 of the coupling 33 is rotated by the output hub 21 of the clutch 19 and drives the output half 35 of the coupling by way of the spider 36. As long as a given torque load is exerted on the driven shaft 17, the spider maintains the coupling halves in a fixed angular relationship. If the torque load is substantially increased, the elastomeric lugs 37 are compressed between the jaws 39 and 40 and yield to allow the input half 34 to turn relative to the output half 35.

According to the present invention, the relative turning which occurs between the coupling halves 34 and 35 is used to advantage to release the clutch 19 when the torque attains or exceeds a predetermined magnitude. For this purpose, coacting means are provided on the control collar 31 and the coupling output half 35 and cause the collar to turn to its release position when the output half is displaced angularly through a predetermined distance relative to the input half upon the occurrence of a torque overload of a given magnitude. Upon being moved to its released position, the collar causes the clutch 19 to release so as to interrupt the drive to the driven shaft 17.

In the embodiment shown in FIGS. 1 to 4, the coacting means comprise opposed abutments 45 and 46 (FIGS. 1 and 3) on the control collar 31 and the coupling output half 35. The abutment 45 comprises a pin fixed to and extending axially from one end of the control collar and projecting into a notch or slot 47 whose one end defines the abutment 46. The notch is formed in the periphery of a ring 49 rotatable with the output half 35 and located adjacent the end of the collar.

When a normal torque load is exerted on the driven shaft 17, the pin 45 is positioned between the ends of the slot 47 as shown in FIG. 3. As the input hub 20 is rotated clockwise as viewed from the right in FIG. 1 (or counterclockwise as seen in FIG. 3), the tang 29 causes the control collar 31 to rotate in a fixed angular position relative to the input and output hubs 20 and 21 and thus the spring 25 contracts around and rotates the output hub and the coupling halves 34 and 35.

If a higher torque load is exerted on the driven shaft 17, the lugs 37 of the spider 36 compress to allow the input coupling half 34, the clutch input and output hubs 20 and 21 and the control collar 31 to turn in a counterclockwise direction (as seen in FIG. 4) relative to the output coupling half 35 and the ring 49. When the torque has increased to a predetermined overload magnitude and the control collar 31 has turned through a given distance relative to the ring 49, the pin 45 engages the end 46 of the slot 47 as shown in FIG. 4 and stops further relative turning of the control collar. With continued relative turning of the output hub 21, the stopped control collar 31 is, in effect, shifted through a short distance in a clockwise direction (referring to FIG. 4) relative to the output hub and thus causes the spring 25 to expand and release the output hub so that the clutch 19 may slip and interrupt the transmission of power to the driven shaft 17. Once the clutch slips, the input and output coupling halves 34 and 35 assume their original relative positions (FIG. 3) and the pin 45 again becomes positioned between the ends of the slot 47 to cause automatic re-engagement of the clutch. If the torque overload has disappeared, normal rotation of the driven shaft is resumed but, if the overload remains, the pin again engages the end 46 of the slot and releases the clutch.

Advantageously, provision is made for adjusting the magnitude of overload which must occur before the clutch 19 is released. To this end, the ring 49 is mounted for angular adjustment on the coupling output half 35 by a set screw (FIGS. 1 and 2) extending through the ring and seating in a groove 51 formed around the periphery of the coupling output half. By adjusting the angular position of the ring, the pin 45 may be selectively set in different initial positions in the slot 47 and will engage the end 46 thereof after the coupling 33 has deflected through different angular distances. Accordingly, adjustment of the ring enables release of the clutch upon the occurrence of overloads of different magnitudes.

A modified clutch and coupling unit 15' is shown in FIGS. 5 to 10 in which parts corresponding to those of the first embodiment are indicated by the same but primed reference numerals. In this instance, the clutch 19' does not re-engage automatically but instead must be manually reset each time it is released by a torque overload.

More particularly, the unit 15' includes a helical spring clutch 19' and a torsionally yieldable coupling 33' generally similar to those of the unit 15. A groove 60 (FIGS. 5 and 7) is formed around part of the coupling input half 34' and receives a latch or pawl 61 formed with a shoulder defining a detent 63. The pawl 61 is pivoted to swing about a pin 64 extending between the side walls of the groove 60 while a coil spring 65 is compressed between the bottom of the groove and the inner side of the pawl to urge the detent 63 outwardly.

Under normal torque loads, the pawl 61 is disposed in a latched position (FIG. 7) in which the detent 63 engages and latches against an abutment in the form of a pin 45' extending axially from the control collar 31'. As long as the pin 45' is latched by the detent 63, the control collar is held in a fixed angular position relative to the clutch output hub 21' and keeps the spring contracted around the hubs 20' and 21' to maintain the drive between the shafts 16' and 17'.

If an overload is imposed on the driven shaft 17', the pawl 61 is released from the pin 45' to enable the control collar 31' to turn angularly relative to the output hub 21' from the position shown in FIG. 7 to the release position shown in FIG. 9. For this purpose, an abutment in the form of a release finger 70 is carried on the inboard end of a sleeve 71 (FIGS. 5 and 6) fastened rigidly to the output half 35' of the coupling 33' and enshrouding the input and output halves 34' and 35' and the spider 36'. One end of the finger 70 projects into the groove 60 and rides against an inclined cam surface 73 formed on the end of the pawl 61 adjacent the detent 63.

As long as the torque is below a predetermined overload value, the finger 70 is positioned relative to the cam surface 73 as shown in FIG. 7 and is not effective to release the detent 63 from the pin 45'. If the torque increases to the overload value, the clutch output hub 21' turns counterclockwise (FIG. 8) relative to the sleeve 71 and the finger 70 as the input half 34' of the coupling deflects and turns relative to the output half 35'. As a result, the cam surface 73 moves along the finger 70 to the position shown in FIG. 8 and the finger swings the pawl 61 counterclockwise about the pin 64 to release the detent 63 from the control collar pin 45'. The control collar then is turned clockwise to the release position shown in FIG. 9 by a contractile spring 77 which is stretched between a pin 79 on the control collar 31' and a pin 80 on the coupling input half 34', the spring being located in a groove 81 in the input half. Once the collar has been turned to its release position, the helical spring 25' relaxes to release the clutch 19'.

As soon as the clutch 19' has been released, the coupling halves 34' and 35' assume their normal undeflected positions and the finger 70 allows the pawl 61 to swing clockwise to the position shown in FIG. 10. The control collar pin 45', however, remains in its release position relative to the output hub 21' and is located behind a concave cam surface 85 (FIGS. 5 and 10) formed on the outer side of the pawl between the detent 63 and the pivot pin 64. Accordingly, the clutch 19' will remain released until the control collar 31' is manually turned in a counterclockwise direction to cause the collar pin 45' to cam the pawl 61 inwardly and then to re-latch with the detent 63 in the position shown in FIG. 7.

As shown in FIG. 5, the release finger 70 is formed integrally with a bracket 90 which is fastened to the sleeve 71 by screws 91 extending through elongated slots 93 in the bracket. By loosening the screws and adjusting the angular position of the bracket on the sleeve, the angular position of the finger 70 relative to the cam surface 73 may be changed to cause the clutch 19' to release at torques of different magnitudes. Also, if desired, a microswitch (not shown) may be mounted in a stationary position alongside the coupling 33'. When the pawl 61 is moved to its released position (FIG. 8), the end 94 of the pawl opposite the detent 63 moves outwardly and will trip the actuator of the switch. The switch may be connected in a circuit with an audio or visual alarm for indicating that the clutch 19' has been released and requires resetting.

From the foregoing, it will be apparent that the present invention brings to the art new and improved clutch and coupling units 15 and 15' in which torsional deflection of the couplings 33 and 33' is used to release the clutches 19 and 19' upon the occurrence of a torque overload. In the case of the unit 15, the pin 45 coacts with the end 46 of the slot 47 to cause movement of the control collar to its release position while, with the unit 15', such movement is caused by the finger 70 freeing the pin 45' from the pawl 61 so as to release the collar to the action of the contractile spring 77.

I claim as my invention:

1. The combination of a clutch and a torsionally yieldable coupling, said clutch having input and output members disposed end-to-end, a coil spring telescoped with said members and normally connecting the latter for rotation in unison, said coupling being located at one end of said clutch and comprising first and second halves disposed end-to-end, said first coupling half being fastened to and rotatable in unison with one of said clutch members, torsionally flexible means spaced axially from said spring and connecting said coupling halves to one another for rotation in a substantially fixed angular relation when a given torque is exerted on one of said coupling halves, said means deflecting torsionally and allowing relative turning of said coupling halves when a higher torque is exerted on said one coupling half, a control collar telescoped over said spring and normally being rotatable in a fixed angular relation with said input and output members and said first coupling half, said control collar being operable when moved to a given angular position relative to said output member to release said spring and enable relative rotation of said input and output members, and means coacting between said control collar and said second coupling half for causing said control collar to move to said angular position when said second coupling half turns a predetermined distance relative to said first coupling half.

2. The combination defined in claim 1 in which said coacting means comprise opposed abutments on said control collar and said second coupling half, said abutments being spaced from one another when said given torque is exerted on said one coupling half and being engageable with one another to move said collar to said angular position when said second coupling half turns said predetermined distance relative to said first coupling half.

3. The combination defined in claim 2 further including means supporting one of said abutments for selective adjustment to different angular positions relative to the other of said abutments.

4. The combination defined in claim 2 in which one of said abutments comprises a pin and the other of said abutments comprises the end of a slot within which said pin is received.

5. The combination defined in claim 4 in which said pin is fixed to and projects axially from one end of said collar, said slot being formed in said second coupling half.

6. The combination defined in claim 1 in which said coacting means comprise a first abutment on said collar and a second abutment on said second coupling half, resilient means acting on said collar and urging the latter toward said angular position, a latch on said output member and moveable between latched and released positions, said latch being engageable with said first abutment when in said latched position and holding said collar out of said angular position, and said second aubtment engaging and releasing said latch when said second coupling half turns said predetermined distance relative to said first coupling half, thereby to cause said collar to move to said angular position under the urging of said resilient means.

7. The combination defined in claim 6 further including means supporting said second abutment for selective adjustment to different angular positions on said second coupling half and relative to said latch.

8. The combination of a clutch and a torsionally yieldable coupling, said clutch having input and output members, a coil spring telescoped with said members and normally connecting the latter for rotation in unison, said coupling being located at one end of said clutch and comprising an input half fastened to and rotatable in unison with said output member, said coupling further comprising an output half, torsionally flexible means spaced axially from said spring and connecting said coupling halves for rotation in a substantially fixed angular relation when a given torque is exerted on said output half, said means deflecting torsionally and allowing relative turning of said coupling halves when a higher torque is exerted on said output half, a control collar telescoped over said spring and normally being rotatable in a fixed angular relation with said input and output members and said input coupling half, said control collar being operable when moved to a given angular position relative to said output member to release said spring and enable relative rotation of said input and output members, and means coacting between said control collar and the output half of said coupling for causing said control collar to move said angular position when said output half turns a predetermined distance relative to said input half.

\* \* \* \* \*